US008333221B2

(12) United States Patent
Ly

(10) Patent No.: US 8,333,221 B2
(45) Date of Patent: Dec. 18, 2012

(54) VARIEGATED RIPSTOP

(75) Inventor: John T. Ly, Richmond, CA (US)

(73) Assignee: The North Face Apparel Corp., Wilmington, DE (US)

( * ) Notice: Subject to any disclaimer, the term of this patent is extended or adjusted under 35 U.S.C. 154(b) by 574 days.

(21) Appl. No.: 12/562,410

(22) Filed: Sep. 18, 2009

(65) Prior Publication Data
US 2011/0070412 A1 Mar. 24, 2011

(51) Int. Cl.
D03D 23/00 (2006.01)
(52) U.S. Cl. .............................. 139/383 R; 66/171; 2/85
(58) Field of Classification Search .................. 139/421, 139/59–65, 426 R, 420 A, 383 R, 387 R; 2/402, 227, 229, 85, 69.5, 69; 66/169 R, 66/170, 171
See application file for complete search history.

(56) References Cited

U.S. PATENT DOCUMENTS

| | | | | | |
|---|---|---|---|---|---|
| 3,032,072 | A | * | 5/1962 | Weiner et al. | 139/422 |
| 3,078,699 | A | * | 2/1963 | Huntley | 66/176 |
| 3,435,461 | A | * | 4/1969 | William | 2/83 |
| 3,985,003 | A | * | 10/1976 | Reed | 66/196 |
| 4,057,981 | A | * | 11/1977 | Runac | 66/185 |
| 4,257,127 | A | * | 3/1981 | Kaupin et al. | 2/75 |
| 4,649,573 | A | * | 3/1987 | Yen | 2/74 |
| 4,682,479 | A | * | 7/1987 | Pernick | 66/176 |
| 4,852,187 | A | * | 8/1989 | Johansson | 2/69 |
| 5,081,854 | A | * | 1/1992 | Lonati | 66/176 |
| 5,441,798 | A | * | 8/1995 | Nishimura et al. | 442/205 |
| 5,651,395 | A | * | 7/1997 | Graham et al. | 139/390 |
| 5,685,347 | A | * | 11/1997 | Graham et al. | 139/390 |
| 6,349,750 | B1 | * | 2/2002 | Fujiwara | 139/384 R |
| 6,389,850 | B1 | * | 5/2002 | Fujiwara | 66/176 |
| 6,474,367 | B1 | * | 11/2002 | Jayaraman et al. | 139/383 R |
| 6,840,288 | B2 | * | 1/2005 | Zhu et al. | 139/425 R |
| 7,047,569 | B1 | * | 5/2006 | Mahon et al. | 2/88 |
| 7,743,476 | B2 | * | 6/2010 | Rock et al. | 28/160 |
| 7,841,369 | B1 | * | 11/2010 | Osborne | 139/421 |
| 2005/0204449 | A1 | | 9/2005 | Baron et al. | |
| 2006/0179539 | A1 | | 8/2006 | Harber | |
| 2010/0242148 | A1 | * | 9/2010 | Rock et al. | 2/69 |
| 2012/0070608 | A1 | * | 3/2012 | Rock et al. | 428/89 |

FOREIGN PATENT DOCUMENTS
JP 2005-087611 A 4/2005

OTHER PUBLICATIONS
International Search Report of PCT/US2010/046164 issued Apr. 27, 2011 & Written Opinion.

* cited by examiner

Primary Examiner — Danny Worrell
(74) Attorney, Agent, or Firm — Kenyon & Kenyon LLP

(57) ABSTRACT

Textiles, garments and methods comprising a fabric and a variegated structure woven in the fabric and adapted to control a parameter of the textile construction. The parameter may be strength, breathability, and/or other properties. A visual pattern may be used to indicate the variegated structure. The visual pattern may be made in one or more of color, material, patterns. The fabric may be a multilayered fabric. A garment may be made of pieces cut from the fabric to satisfy a desired garment profile. The garment profile may be based on a parameter of strength, breathability, and/or other properties.

3 Claims, 3 Drawing Sheets

US 8,333,221 B2

VARIEGATED RIPSTOP

TECHNICAL FIELD

The present invention relates to textile constructions, such as those used in the sporting and garment industries.

BACKGROUND

The use of specialized fabrics in the sporting and garment related industries is a common practice. The demands of contemporary sports, professions, rigorous lifestyles, and the like on conventional fabrics render them unsuitable for a variety of reasons, including the challenges associated with configuring the fabrics to adapt to internal and external environmental needs. Specialized fabrics have been developed to withstand such rigors. These fabrics often exhibit greater strength, better ventilation, climate control and tear prevention characteristics.

Ripstop fabric is one such specialized fabric. Ripstop is a woven material that resists tearing and ripping due to its crosshatched threading. In the outdoor sporting industry, ripstop fabric is commonly used for camping equipment, parachutes, hang gliders, hot air balloons, sails, kites, flags, banners and clothing, including sports clothing and military and firefighting clothing. Ripstop fabric is made by weaving nylon threads throughout a base material in interlocking patterns. As these materials tend to "rip" easily, the nylon ripstop fibers prevent the tearing of the base material beyond the crosshatches of the ripstop fabric.

Ripstop also describes a method of modifying the warp and weft of a fabric to enable it to contain any rips or tear. The warp is the tightly stretched lengthwise core of a fabric, while the weft is woven between the warp threads to create various patterns. In the event of a rip, small squares contain the rip and stop it from spreading along the length of the fabric. Ripstop and other specialized fabrics have been the subject of numerous patents and patent applications.

U.S. Patent Application Publication No. 2008/0086798 to Allen et al. describes a simulated ripstop fabric. The simulated ripstop fabric includes a plurality of body yarns that form a body of the fabric, and a plurality of pseudo ripstop yarns provided within the fabric in a grid pattern in which several body yarns are placed between each consecutive pseudo ripstop yarn in both the warp and filling directions of the fabric. The grid pattern forms a plurality of squares.

U.S. Patent Application Publication No. 2006/0179539 to Harber describes garments that include targeted venting zones that assist in cooling the wearer. The garments include a first fabric panel and a pattern of openings defined in the first fabric panel, in which the pattern is defined based on a thermal profile of a body, and the thermal profile distinguishes between areas of the body having different thermal characteristics. The thermal profile defines a first area of the body having a first thermal characteristic and a second area of the body having a second thermal characteristic, and the pattern of openings will define locations for plural openings of a first size corresponding to the first area and locations for plural openings of a second size corresponding to the second area.

U.S. Patent Application Publication No. 2006/0068155 to Rock et al. describes a fabric article with knitted or woven construction of multi-filament, interlaced yarns that has an inner surface and an outer surface. The inner surface has at least one region of pile or raised fibers or fleece formed thereupon and the outer surface has at least one region of a non-continuous coating of binder material adhered to yarns and to yarn fibers, such as at least at interlacing intersections, for enhanced durability of the outer surface against pilling or fraying during use.

One problem with conventional ways of using fabrics in making garments is the inability to achieve the versatility available with multi-fabric compositions with single fabric. For example, a jacket may need different fabric strength and breathability for different body sections, such as, shoulder, sleeve, armpit, etc. In this regard, a garment is usually made of multiple fabrics to achieve desired breathability, thermal characteristics, and the like for different parts of the garment. Therefore, despite the advancements in making fabrics and garments, there still exists a need for versatile fabrics with varying strength and breathability woven in a single fabric without sacrificing quality or comfort to meet the current and evolving demands of high performance fabrics in the recreational and professional sporting and garment industries.

SUMMARY

The invention is directed to improvements in textile constructions, and particularly improvements in the preparation and application of fabrics with varied strength and breathability woven in different areas of a single fabric.

In an embodiment of the invention, a textile construction is provided. The textile construction comprises a base fabric and a variegated structure woven in the base fabric and adapted to control a parameter of the textile construction. The variegated structure may comprise a plurality of longitudinal threads and a plurality of transverse threads. The longitudinal threads and transverse threads intersect forming a plurality of cells in the variegated structure. In this embodiment, at least one cell in a first portion of the variegated structure is larger than at least one cell in a second portion of the variegated structure.

In this embodiment, the parameter may be a strength of the textile construction. A portion of the textile construction corresponding to the second portion of the variegated structure is stronger than a portion of the textile construction corresponding to the first portion of the variegated structure.

The parameter may also be breathability of the textile construction. A portion of the textile construction corresponding to the first portion of the variegated structure has a higher breathability than a portion of the textile construction corresponding to the second portion of the variegated structure.

In this embodiment, at least one of the plurality of longitudinal threads and the plurality of transverse threads comprise nylon. The variegated structure may also be ripstop.

In another embodiment, a garment including pieces of fabrics cut from textile construction is provided. The textile construction comprises a base fabric and a variegated structure woven in the base fabric and adapted to control a parameter of the textile construction. The variegated structure may comprise a plurality of longitudinal threads and a plurality of transverse threads. The longitudinal threads and transverse threads intersect forming a plurality of cells in the variegated structure. In this embodiment, at least one cell in a first portion of the variegated structure is larger than at least one cell in a second portion of the variegated structure.

In this embodiment, the fabric may further comprise a backer layer disposed on an inner surface of the textile construction and a face fabric layer disposed on an outer surface of the textile construction. In this embodiment, the face fabric layer may be laminated on the textile construction. The face fabric layer may also be printed on the textile construction.

A further embodiment provides for a method of forming a textile construction. The method comprises forming a base fabric and forming a variegated structure woven in the base fabric wherein the variegated structure controls strength and breathability of the textile construction varying across the textile construction. The variegated structure may comprise a plurality of longitudinal threads and a plurality of transverse threads. The longitudinal threads and transverse threads intersect forming a plurality of cells in the variegated structure. In this embodiment, the method may also comprise adjusting at least one cell in a first portion of the variegated structure to be larger than at least one cell in a second portion of the variegated structure to control a parameter of the textile construction.

A still further embodiment provides for a method of preparing a garment comprising forming a textile construction. The method comprises forming a base fabric and forming a variegated structure woven in the base fabric. The variegated structure comprises a plurality of longitudinal threads and a plurality of transverse threads. The longitudinal threads and transverse threads intersect forming a plurality of cells in the variegated structure. In this embodiment, the method may also comprise adjusting at least one cell in a first portion of the variegated structure to be larger than at least one cell in a second portion of the variegated structure to control a parameter of the textile construction.

In this embodiment, the method may further comprise selecting a portion of the textile construction to correspond to a portion of the garment based on at least one of a variegation profile of the variegated structure and a garment profile of the garment. The variegation profile may be based on a location of the first portion and a location of the second portion of the variegated structure on the textile construction. The garment profile may be based on at least one parameter of a portion of the garment. The parameter may be strength. The parameter may also be breathability.

Depending on the embodiment, the invention can have advantages including greater strength and breathability, better control over strength and breathability, simplicity of design, improved ease of development and/or improved overall performance. These and other features and advantages of the disclosed constructions and methods are described in, or apparent from, the following detailed description of various exemplary embodiments.

BRIEF DESCRIPTION OF THE DRAWINGS

Various embodiments will be more readily understood through the following detailed description, with reference to the accompanying drawings, in which.

DETAILED DESCRIPTION

Figure 1:
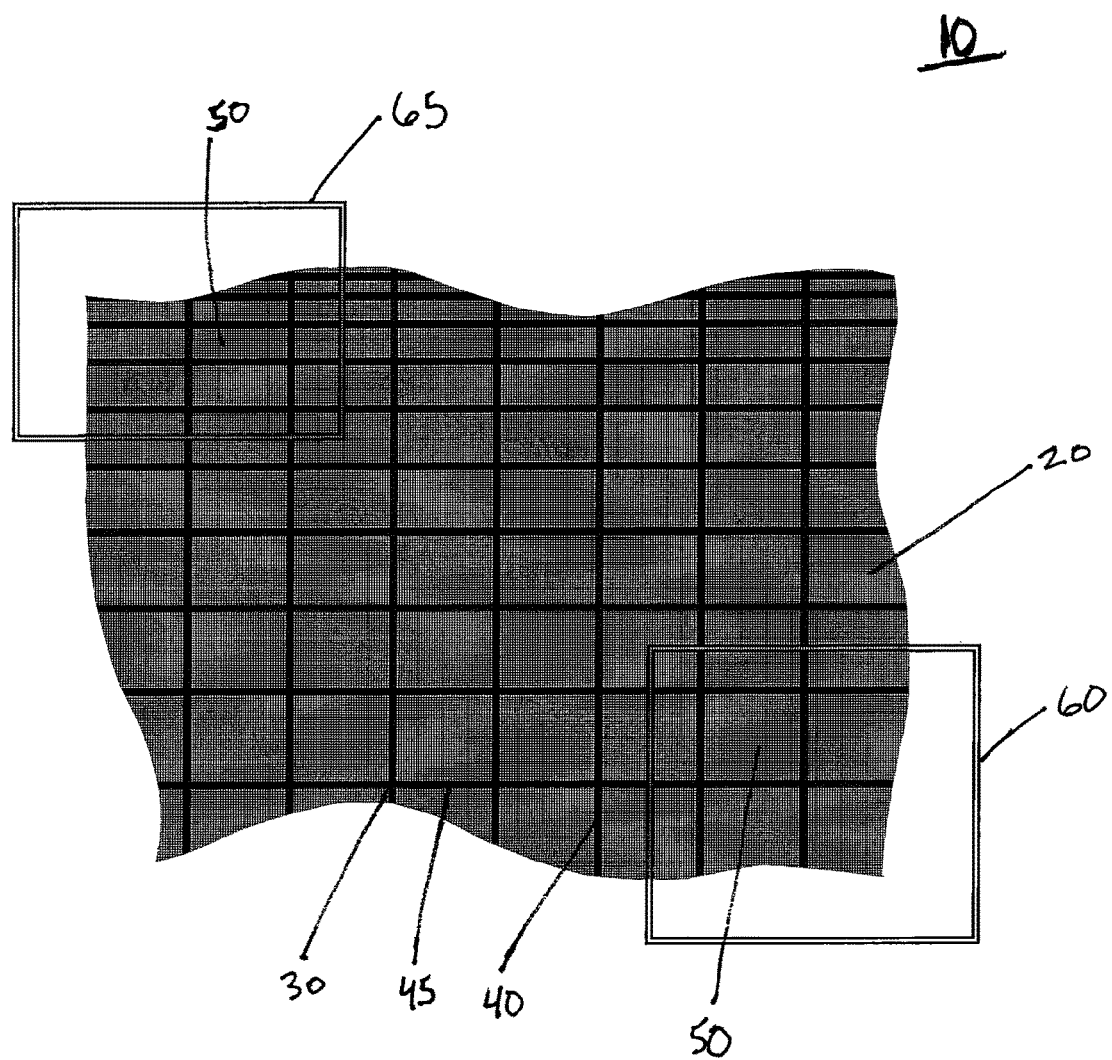
FIG. 1 is a plan view of a textile construction according to a first embodiment of the present invention.

For a general understanding of the features of the illustrated embodiments of the invention, reference is made to the drawings. In the drawings, like reference numerals have been used throughout to designate like elements.

As illustrated in FIG. 1, a textile construction 10 according to a first embodiment includes a fabric 20 and a pattern 30 woven in the fabric 20. In one embodiment, the pattern 30 may be a part of a variegated structure. The pattern 30 may comprise a plurality of longitudinal lines 40 and a plurality of transverse lines 45. In this embodiment, the longitudinal threads 40 and transverse threads 45 intersect forming a plurality of cells 50.

The fabric 20 may be comprised of any suitable material. In embodiments, the fabric 20 may comprise one or more layers of materials, for example, cotton, silk, nanoweb, polyester, polypropylene or other polymer-based materials. It is contemplated that the fabric 20 may be dependent upon the nature of the object or garment for which the textile construction 10 will be used. For example, the composition of the base fabric 20 may comprise an elastic-based stretchable material for athletes, fire resistant material for firefighters or high durability material for camping equipment and/or military purposes. Other materials suitable for use in the fabric 20 will be readily apparent to one of ordinary skill in the art.

The pattern 30 is comprised of longitudinal lines 40 and transverse lines 45. In one embodiment, the longitudinal lines 40 and transverse lines 45 may be comprised of threads made of a nylon-based ripstop material that is different from the material for the fabric 20. In one embodiment, Lines 40, 45 may be stronger and more tear-resistant than the material of the fabric 20 such that any rips, tears, or other damage in the base fabric 20 may be confined to respective cells 50 within which the rips, tears or other damages occur and do not infiltrate neighboring cells 50. Other materials suitable for lines 40, 45, such as those conventionally used in fabric manufacturing technology, will be readily apparent to one of ordinary skill in the art. In another embodiment, the lines 40 and 45 may be for color patterning and are made of the same material as the fabric 20.

In one embodiment, the longitudinal lines 40 may be orthogonal to transverse lines 45 resulting in a crosshatched pattern of the pattern 30 in the textile construction 10, as shown in FIG. 1. Other suitable configurations such as, for example, various diamond shapes, are also within the scope and spirit of this invention. The size of the lines 40, 45 in this embodiment are not particularly limited. In some embodiments, the lines 40, 45 may be threads having a denier rating in the range of from about 30 denier to about 1050 denier, depending on the object or garment. Higher denier threads (e.g., 850 denier) are appropriate for objects comprising, for example, heavier canvas materials while lower denier threads (e.g., 70 denier) are more appropriate for, for example, lightweight jackets and camping equipment. In certain embodiments, the lines 40, 45 may be larger in diameter than the yarns of the fabric 20 such that the pattern 30 is raised relative to the fabric 20 giving the textile construction three-dimensionality. These dimensions along with the configurations of the pattern 30 described herein provide for additional elements of control over the appearance and effect of the textile construction 10.

In one embodiment, the nylon-based ripstop threads for lines 40, 45 may be treated. In embodiments, the threads used for lines 40, 45 may include, for example, silicon impregnated ripstop, polyurethane coated ripstop, reflective ripstop, heat and solar reflective ripstop. Other treatments readily apparent to one of ordinary skill in the art are within the scope and spirit of this invention.

Uniform configurations of fibers/yarns in fabrics are common in the art. Also, uniform configuration of ripstop material in fabrics are also known. For example, conventional use of ripstop in the art involves application of ripstop to a fabric, such as a parachute, tent or bag, to achieve uniform strength and tear resistance. In this regard, uniform fiber configurations generally results in uniform strength and tear resistant effect. Such uniformity may be beneficial in certain circumstances. However, this uniformity may limit the ability of a manufacturer to customize certain objects or garments to particular needs.

In this regard, it is not possible to use one ripstop fabric to construct an entire object or garment with, for example, variable strength and breathability demands. Instead, to achieve this effect, it is well known in the art to combine multiple fabrics or fabric layers with varying qualities to achieve an overall product in accordance with predetermined specifications or demands.

In one embodiment of the present invention, the pattern 30 may be an indication of a variegated structure woven into the fabric 20. The fabric 20 with the variegated structure may satisfy this long-felt need in the art by providing a single fabric having varied breathability and strength in different areas of the fabric. The configuration of the lines 40, 45 of the pattern 30 may indicate different areas of the fabric 20 have variable strength and breathability characteristics. Thus, fabric 20 may take on characteristic of multiple fabrics and may reduce or even eliminate the need to apply multiple fabrics in developing a sophisticated object or garment.

In an embodiment, the pattern 30 may indicate that different areas of the fabric 20 may have different constructions (e.g., a variegated structure). For example, a respective cell 50 in a first portion 60 of the pattern 30 may be larger than a respective cell 50 in a second portion 65 of the pattern 30, as illustrated in FIG. 1. Across the pattern 30, the configuration of the lines 40, 45 may indicate the size and location of respective cells 50. In one embodiment, for example, many differently sized cells 50 exist and the cells 50 are located in different areas relative to each other across the pattern 30. The sizes of respective cells 50 may indicate different constructions for the fabric at respective areas. In one embodiment, the density of yarns and/or type of yarns used in different areas may be different. In another embodiment, the material used in different areas may be different. In yet another embodiment, manufacturing steps may process the different areas differently. A variety of manufacturing techniques may be used to make different areas of the fabric 20 to have different breathability and strength.

In one embodiment, the fabric 20 may be adapted to exhibit desired primary qualities of the textile construction 10 according to the demands of the object or garment (e.g., light jacket, think jacket, pants, tents). The pattern 30 may indicate a variegated structure different areas that allows further control of the qualities of the fabric 20. Thus, different areas of the fabric 20 may provide pieces of fabrics with different breathability and strength for different part of a final product (e.g., garment, packs, tents).

In one embodiment, a variegated structure varies strength of the fabric 20 among the different areas of the textile construction 10. For example, a portion of the fabric 20 covered by groups of smaller cells 50 may have greater strength compared to a portion of the fabric 20 covered by groups of larger cells. The varied strength may be achieved by, e.g., density of threads/yarns, different weaving patterns, different materials, different manufacturing processes (chemical, mechanical, etc).

In another embodiment, a variegated structure varies breathability of the fabric 20 among the different areas of the textile construction 10. Larger cells 50 and groups of larger cells 50 may indicate greater breathability as compared to portions where smaller cells 50 or groups of smaller cells 50 exist. For example, a portion of the textile construction 10 corresponding to the first portion 60 of the pattern 30 may have a higher breathability than a portion of the textile construction 10 corresponding to the second portion 65 of the pattern 30. The varied breathability may be achieved by, e.g., density of threads/yarns, different weaving patterns, different materials, different manufacturing processes (chemical, mechanical, etc)

Although strength and breathability have been discussed herein with respect to properties of the textile construction 10, it is contemplated that other properties may also be adjusted by controlling the configuration of the variegated structure of the fabric 20.

In the embodiment illustrated in FIG. 1, longitudinal lines 40 are equidistant from adjacent longitudinal lines 40 while each successive transverse lines 45 in one direction vary in distance from the adjacent transverse lines 45. However, any suitable configuration of longitudinal lines 40 and transverse lines 45 is within the scope and spirit of this invention. For example, the spacing of the longitudinal lines 40 may vary while the spacing of the transverse lines 45 is kept constant or the spacing of both the longitudinal lines 40 and the transverse lines 45 may vary. Likewise, any suitable pattern or variation in the spacing of the lines 40, 45 of the pattern 30 is contemplated. In this regard, the configuration of the pattern 30 may be dependent on several factors including, but not limited to, the nature of the object or garment for which the textile construction 10 will be used.

In one or more embodiments, a fabric with a variegated structure manufactured according to this disclosure may use a different pattern to indicate the variegated structure. For example, one embodiment may have color patterns, and varied shades of colors may be used to indicate a variegated structure. Another embodiment may use repetitive patterns and varied densities of repetitive patterns may be used to indicate a variegated structure. In a further embodiment, a fabric with a variegated structure manufactured according to this disclosure may use no pattern to indicate the variegated structure.

In one or more embodiments, a fabric with a variegated structure manufactured according to this disclosure may be a multi-layered fabric. In one embodiment, the fabric 20 may be a ripstop fabric with a variegated structure. The ripstop fabric may comprise a three-layer construction. The top layer may be one type of material (e.g., threads/yarns, chemically processed materials) suitable for external use (e.g., exposed to the outside) and the bottom layer may be one type of material (e.g., threads/yarns) suitable for internal use (e.g., in contact with human body). The middle layer may comprise a woven material that resists tearing and ripping due to a cross-hatched threading. The variegated structure of the fabric 20 may be implemented by the middle layer. In one embodiment, the variegated structure may be laminated onto the middle layer. In another embodiment, the variegated structure may be printed onto the middle layer. In a further embodiment, the variegated structure may be laminated or printed onto the back of the top or the back of the bottom layer, thus eliminate the need of the middle layer in a multi-layered fabric.

Figure 2A:
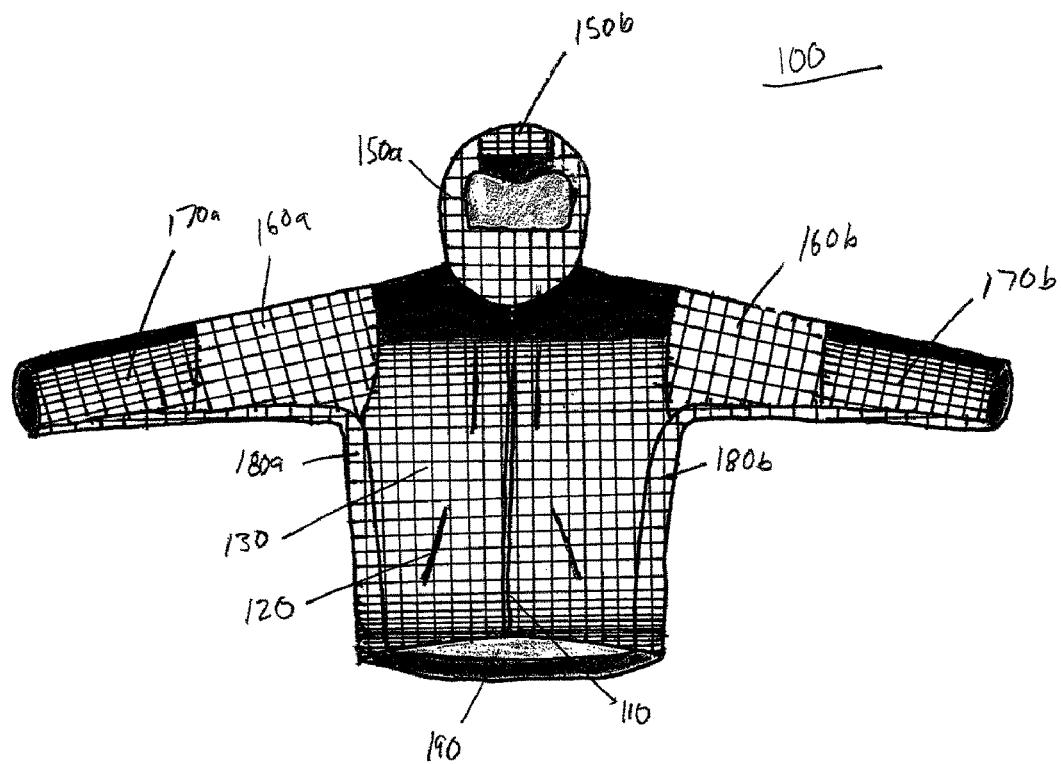
FIGS. 2A and 2B are front and rear perspective views, respectively, of a garment including the textile construction illustrated in FIG. 1.
Figure 2B:
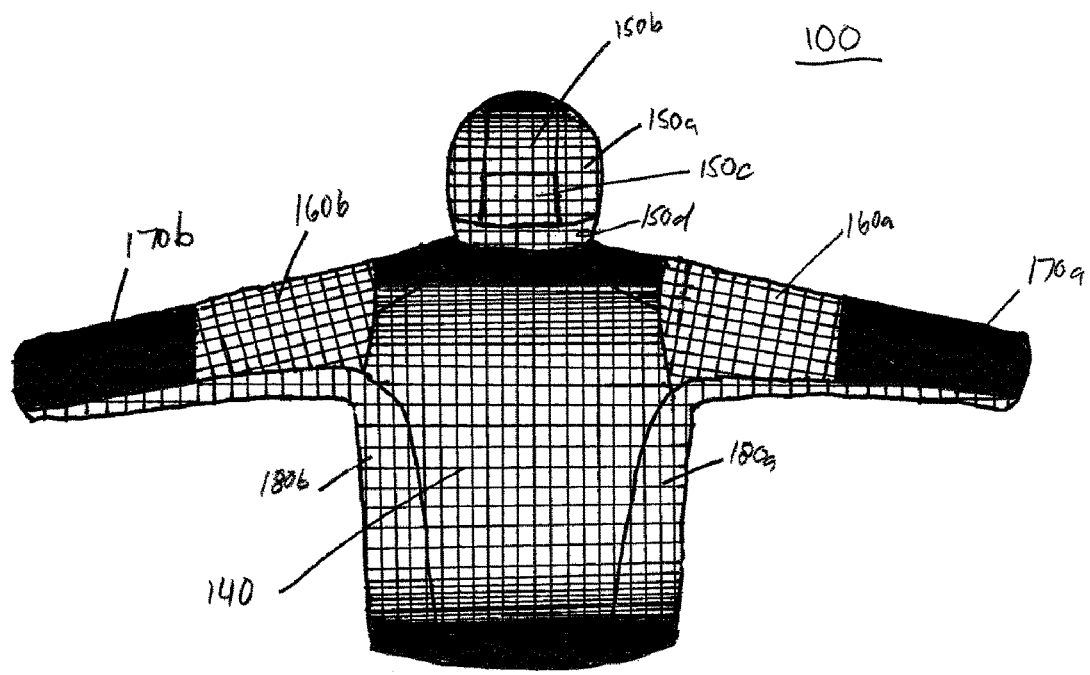

FIGS. 2A and 2B illustrate front and back views, respectively, of a garment 100, a jacket, including a fabric comprising a textile construction 10 according an embodiment of the present disclosure. For purposes of this disclosure, the object described with respect to the enclosed embodiments is a jacket. It will be appreciated, however, that the textile construction 10 can be used with any suitable garment or object including, but not limited to, objects or garments commonly used in camping, sporting, firefighting and other professions, the military and fashion or any other arena readily apparent to one of ordinary skill in the art.

As shown in FIGS. 2A and 2B, the jacket 100 may have a zipper 110, pockets 120, ventral section 130, dorsal section 140, hood sections 150a, 150b, 150c and 150d, upper sleeve sections 160a and 160b, lower sleeve sections 170a and 170b, lateral sections 180a and 180b and lining 190. In one embodiment, the fabric of jacket 100 may be made of polyester, wool, cotton, or any suitable material.

In this embodiment, the fabric of the jacket 100 comprises the textile construction 10. Portions of the textile construction 10 correspond to sections of the jacket 100. Each section of the jacket 100 may have different requirements in terms of strength and breathability. For example, the shoulder areas of the ventral section 130 and dorsal section 140, and the lower sleeve portions 170a, 170b require greater strength but less breathability than, for example, the lateral sections 180a, 180b, which require more breathability.

Figure 3:
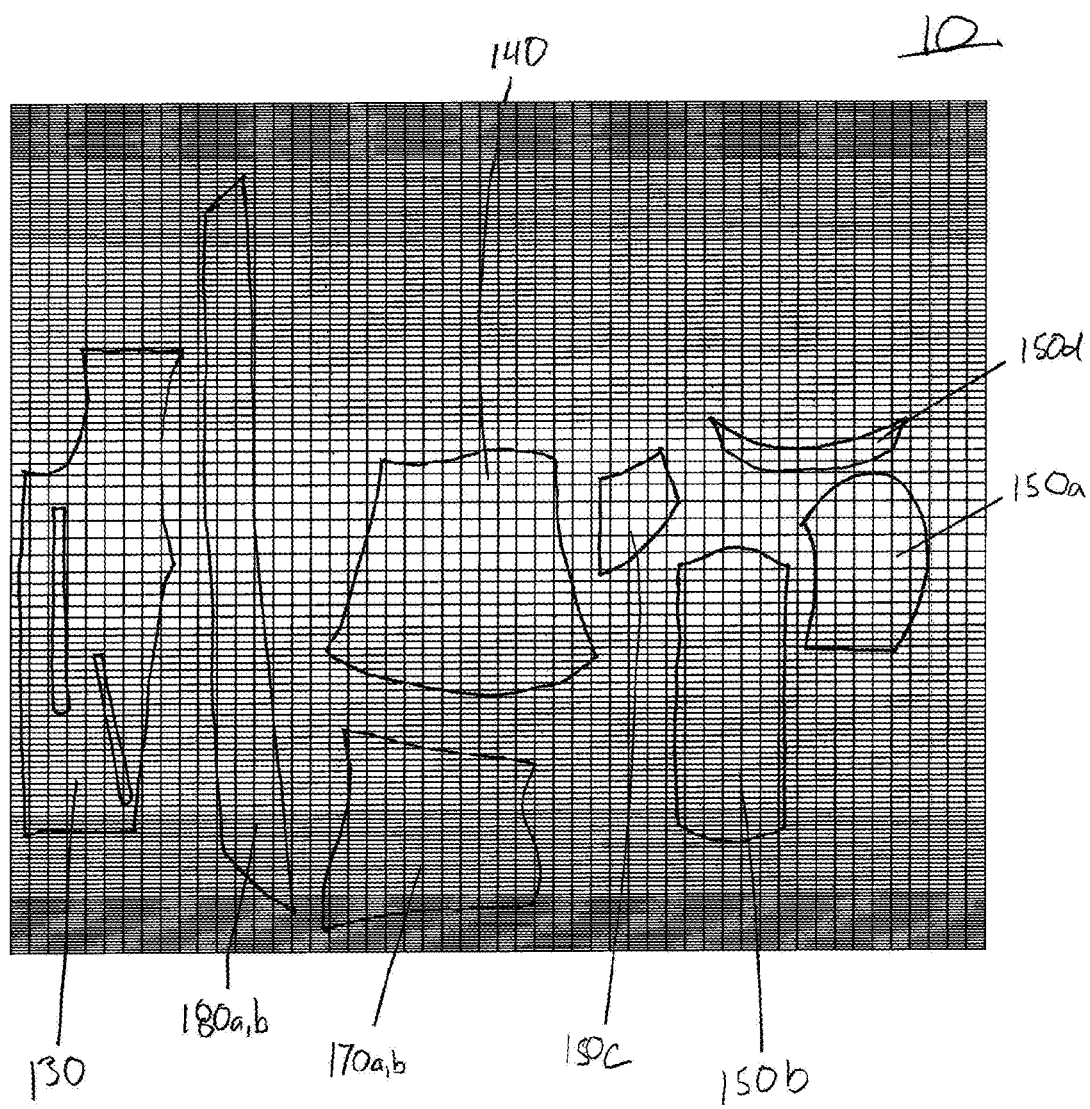
FIG. 3 is an enlarged plan view of the textile construction according to the first embodiment showing sections of the garment illustrated in FIG. 2.

As illustrated in FIG. 3, for example, the component parts of the jacket 100 may be cut from the textile construction 10 and seamed together to form the garment 100. The component parts may be seamed together using any suitable means known in the art, for example, using flat, reinforced, and/or curved stitching. Based on the configuration of the variegated structure indicated by the pattern 30 of the textile construction 10, the manufacturer can selectively design the jacket 100 based on specifications for that particular section of the garment. For example, as illustrated in FIG. 3, sections for the ventral section 130 and dorsal section 140 may be cut from the portions of the textile construction 10 that correspond to portions of the pattern 30 with groups of larger cells. These sections, as described herein, may permit greater breathability. Conversely, shoulder areas of the ventral section 130 and dorsal section 140 and portions of the lower sleeve sections 170a, b, for example, are cut from portions of the textile construction 10 that correspond to portions of the pattern 30 with groups of smaller cells. In this manner, a single garment 100 with variable characteristics can be constructed from a single textile construction 10.

In this embodiment, the manufacturer may also select a portion of the textile construction 10 to correspond to a portion of the garment 100 based on at least one of a variegation profile of the variegated structure indicated by the pattern 30 and/or a garment profile of the garment 100. The variegation profile is a mapping of a characteristic or characteristics of the variegated structure indicated by the pattern 30 that are unique to that variegation structure. Likewise, the garment profile is a mapping of a characteristic or characteristics of the garment 100 that are unique to that garment.

The variegation profile may be based on any suitable characteristic of the variegated structure. In embodiments, the variegation profile may be indicated by a location and size of cells 50 or groups of cells 50 that make up the unique pattern 30. Thus, in selecting portions of the textile construction 10 suitable for the garment 100, a manufacture may take into account the variegation profile of the variegated structure in order to design and cut an appropriate section of the textile construction 10 for the garment 100. Other suitable characteristics include, but are not limited to, the three-dimensional characteristics of the pattern 30.

The garment profile may be based on any suitable characteristic of the garment 100. In embodiments, the garment profile is, for example, strength or breathability requirements of the garment. For example, referring back to FIGS. 2A and 2B, the garment profile for the jacket 100 is apparent from the pattern 30 on the outer surface of the garment 100. As disclosed herein, the human body has differing strength and breathability requirements that dictate a garment 100 with corresponding adaptation to those demands. Other suitable characteristics include, but are not limited to, thermal requirements and visual appearance of the garment 100. Based on the garment profile and/or the variegation profile, appropriate sections of the textile construction 10 for the garment 100 can be ascertained.

Accordingly, by constructing a textile composition by forming a fabric 10, forming a variegated structure and in some instances a pattern 30, and varying properties in portions of the variegated structure of the textile construction 10 in a controlled manner, a customized garment 100 can be created using pieces cut from one fabric. Thus, the textile construction 10 may take on characteristic of multiple fabrics. By cutting components for the garment 100 from the textile construction 10, one piece of component may comprise areas of the textile construction 10 with varying properties (e.g., strength, breathability). That said, the garment 100 may require fewer bulky seams. Therefore, instead of using multiple fabrics to accomplish a comfort zone garment, with embodiments according to the present disclosure, a garment may only use one fabric and fewer seams.

In one embodiment, the textile construction 10 may comprise a single layer. In another embodiment, however, the fabric 20 may further comprise a backer layer disposed on an inner surface of the textile construction. A backer layer in accordance with certain embodiments of the present invention may be any knit backer or other fabric suitable for use as an inner layer of a multi-layer construction. Non-limiting examples of suitable material for the backer layer include a brush backer or a warp knit tricot backer.

In another embodiment, the textile construction 10 may comprise a face fabric layer disposed on an outer surface of a back layer. The face fabric layer may be laminated on the back layer or vice versa. In another embodiment, the face fabric layer may be printed on the back layer to achieve selective application of the face fabric layer. Methods and adhesives used in combining multiple fabric layers and applying printing effects are well known in the art.

The face fabric layer may be comprised of any suitable material. For example, in embodiments, the face fabric layer may comprise and elastic, fleece, nylon, polyester, water-resistant or water-repellant material, or combination thereof known in the art and suitable for use as an outer layer of a multi-layer construction. Non-limiting examples of suitable material for the face fabric layer include a polyester nylon elastic fabric.

Disclosed embodiments have been described with reference to several exemplary embodiments. There are many modifications of the disclosed embodiments which will be apparent to those of skill in the art. It is understood that these modifications are within the teaching of the present invention which is to be limited only by the claims.

What is claimed is:

1. A method of making a garment comprising:
    forming a textile construction comprising:
    forming a fabric;
    forming a variegated structure woven in the base fabric, the variegated structure comprises a plurality of longitudinal threads and a plurality of transverse threads, the longitudinal threads and the transverse threads intersect forming a plurality of cells in the variegated structure, and the at least one cell in a first portion of the variegated structure is larger than at least one cell in a second portion of the variegated structure;
    selecting a portion of the variegated structure on the textile construction to correspond to a portion of the garment based on at least one of variegation profiles of the variegated structure, the variegation profile is based on a location of the portion of the variegated structure on the textile construction;

varying variegation profiles of the variegated structure in order to control strength and breathability of the textile construction;

cutting pieces from the textile construction; and sewing the pieces to form the garment.

2. The method according to claim 1, wherein at least one of the pieces comprises a portion of the textile construction to correspond to a portion of the garment based on a desired strength profile.

3. The method according to claim 1, wherein at least one of the pieces comprises a portion of the textile construction to correspond to a portion of the garment based on a desired breathability profile.

* * * * *